March 8, 1932.   A. B. WILLIS   1,848,590
MEANS FOR EXTRACTING BROKEN SCREWS, NAILS, AND THE LIKE
Filed Oct. 8, 1930
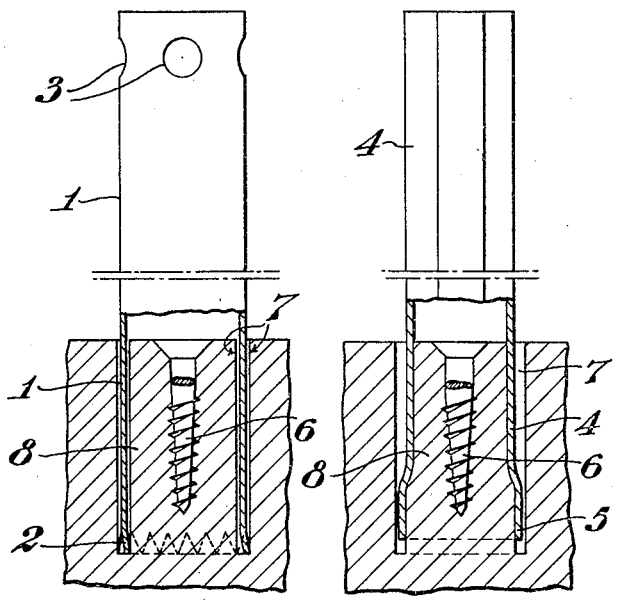
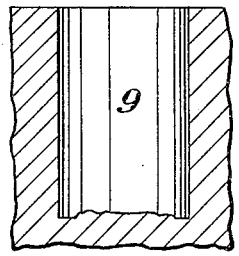
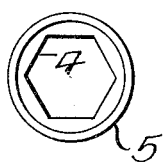 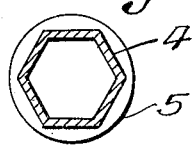
INVENTOR
A. B. WILLIS Patented Mar. 8, 1932

1,848,590

UNITED STATES PATENT OFFICE

ALFRED BURT WILLIS, OF PENZANCE, ENGLAND

MEANS FOR EXTRACTING BROKEN SCREWS, NAILS, AND THE LIKE

Application filed October 8, 1930, Serial No. 487,350, and in Great Britain June 16, 1930.

This invention relates to a means for easily and quickly removing screws, nails and the like which have broken off below the surface of the wood, ebonite, fibre or like material into which they have been screwed.

To remove or extract a broken-off screw is at all times a difficult matter and one which often involves the damaging of the material surrounding the broken-off screw, and the object of the invention is the provision of a means which obviates the above inconvenience and effects the easy and quick removal of the screw.

Briefly, the invention consists in two interdependent members, the one a rotatable cutter for forming a core round the broken screw, the other an extractor to be driven on to and grip the core and contained screw and break the same away from the material of which the said core forms a part.

The invention is illustrated by the accompanying sheet of drawings, wherein:—

Figure 1 is a vertical sectional view illustrative of the rotatable cutter and the core produced by the said cutter.

Figure 2 is a vertical sectional view illustrative of the extractor and its application to the core produced by the rotatable cutter.

Figure 3 is a vertical sectional view showing the hole left by the removal of the core and broken screw contained therein.

Figure 4 is a cross sectional view of the device used for removing cores.

Figure 5 is a bottom plan view of the construction shown in Figure 4.

In carrying out the invention and referring to the drawings, the cutter is constituted by a cylindrical steel tube 1 provided at one end with teeth 2 after the manner of a cylindrical saw or trepan, alternate teeth being off-set, inwardly and outwardly, to give clearance when cutting.

The cutter may, as shown in Figure 1, be formed with holes 3 for a tommy bar wherewith to rotate the cutter, or it may be fitted with a handle or left plain to be gripped in a self-centering chuck, or be elongated and tapered to fit in a carpenter's brace; if tapered, the cutter will be suitably slotted to allow of the core which might break off, being readily removed.

The extractor is constituted by a length of steel-tube 4, of square, hexagonal, or any section other than circular, which for a short distance at one end 5 thereof is bellied out, as shown in Figure 2, to a circular formation.

The cutter and extractor will be made in various sizes to suit the screws, nails and the like to be removed.

In use, the cutter 1, held by a tommy bar, or chuck of a carpenter's base or drill, is brought centrally over the broken screw or nail 6 to be extracted, and then rotated until a circular groove 7 is cut in the material surrounding the screw or nail 6 and slightly deeper than the depth of said screw or nail 6, leaving an upstanding core 8 containing the same.

The extractor 4 is then, by its bell-mouth 5, placed on the core 8 and driven well down into the groove 7, the bell-mouth 5 being a reasonable fit in said groove 7, so that the squared, flatted or contracted part of the extractor 4 firmly grips the core 8 aforesaid.

The squared or contracted part of the extractor 4 is now gripped with a spanner and given a right or left hand twist which breaks off the core 8 containing the broken screw or nail 6, which core 8, and with it the broken screw or nail 6, is then removed by lifting it, leaving, as shown in Figure 3, a circular hole 9 which can be plugged and a new screw or nail inserted thereinto.

I claim:—

A device for extracting cores containing broken fastenings from the body in which they are embedded, comprising a hollow tubular member having a flaring circular mouth portion and a body of angular cross sectional shape, the said flaring mouth portion and the angular body portion being joined by a tapering connecting wall whereby the device may be driven onto the circular core to force and compress the core into the angular portion of the tube, and means for imparting a rotary motion to the tubular member to twist off the core gripped in the angular portion thereof.

In testimony whereof I have affixed my signature hereto this ninth day of September, 1930.

ALFRED BURT WILLIS.